INVENTORS
WILLIAM G. BURHANS &
WENDELL H. GRAY

ATTORNEYS

Jan. 26, 1965   W. G. BURHANS ETAL   3,167,507
FILTER

Filed June 20, 1963   3 Sheets-Sheet 2

INVENTORS
WILLIAM G. BURHANS &
WENDELL H. GRAY
BY

ATTORNEYS

INVENTORS
WILLIAM G. BURHANS &
WENDELL H. GRAY
BY
ATTORNEYS

United States Patent Office
3,167,507
Patented Jan. 26, 1965

3,167,507
FILTER
William G. Burhans, Kingston, and Wendell H. Gray, Barclay Heights, Saugerties, N.Y., assignors to W.G.B. Oil Clarifier, Inc., Kingston, N.Y., a corporation of New York
Filed June 20, 1963, Ser. No. 289,267
11 Claims. (Cl. 210—117)

This application is a continuation-in-part of our application Serial No. 22,844, filed April 18, 1960 and now abandoned.

This invention relates generally to oil filters, and particularly to improvements in oil filters of the full-flow, partial-flow type.

Lubricating oil used in the operation of internal combustion engines is contaminated with solids which are injurious to bearings and impalpable solids, such as colloidal carbon, that will pass through the bearing clearances but discolor the oil. It is common to remove solids that are injurious to bearings through the medium of a full-flow filter section comprising a filter element adapted for passing the large quantities of lubricating oil required for force feed lubrication, and to remove impalpable solids through the medium of a partial-flow filter section comprising an open fibrous material filter element of considerable thickness through which the oil moves slowly under light pressure. With regard particularly to automobile engines, a major quantity of lubricating oil courses from the crank case through the full-flow filter element to the bearings and then back to the crank case. A minor quantity of the lubricating oil courses from the crank case, through the open fibrous material filter element (by-passing the full-flow filter element) and back to the reservoir. Initially, enough of the finely divided filter impurities are filtered out by the partial-flow filter element to maintain clear oil on the dip stick until a bed of such impurities is built up on the full-flow section. During this build-up period, flow is relatively free through the full-flow section. As the solid matter builds up on the full-flow section, it increases the ability of the full-flow element to stop such material. Eventually the full-flow section takes over the duty of filtering out solids injurious to the bearings. Thereafter the sole duty of the partial-flow section is to filter out impalpable solids. All of the lubricating oil eventually passes through the open fibrous material filter element. As a consequence of the foregoing, all of the lubricating oil is maintained free of solids injurious to the bearings and free of impalpable solids that discolor the oil.

An object of the invention is to provide a filter cartridge having full-flow and partial-flow sections combined in a single replaceable unit.

Another object is to provide such a filter cartridge with identical opposite end portions, thus making it possible to make one large filter assembly by stacking a plurality of cartridges.

Another object is to provide improved means for mounting the filter cartridge in its housing and for feeding the lubricating oil to the cartridge.

Another object is to provide such a filter unit with valve means for trapping oil in the filter unit when the engine is stopped.

Another object is to provide means for trapping dirt particles which might fall into the filter during changing of the filter element whereby such particles cannot get into the oil system.

Another object is to provide air bleeds for the filter, which permit the escape of air from the various passages when the filter is being filled and which are effective when the filter is mounted in either a vertical or a horizontal position.

Other objects of the invention will become apparent when the following disclosure is read with reference to the accompanying drawings, in which.

Figure 1:
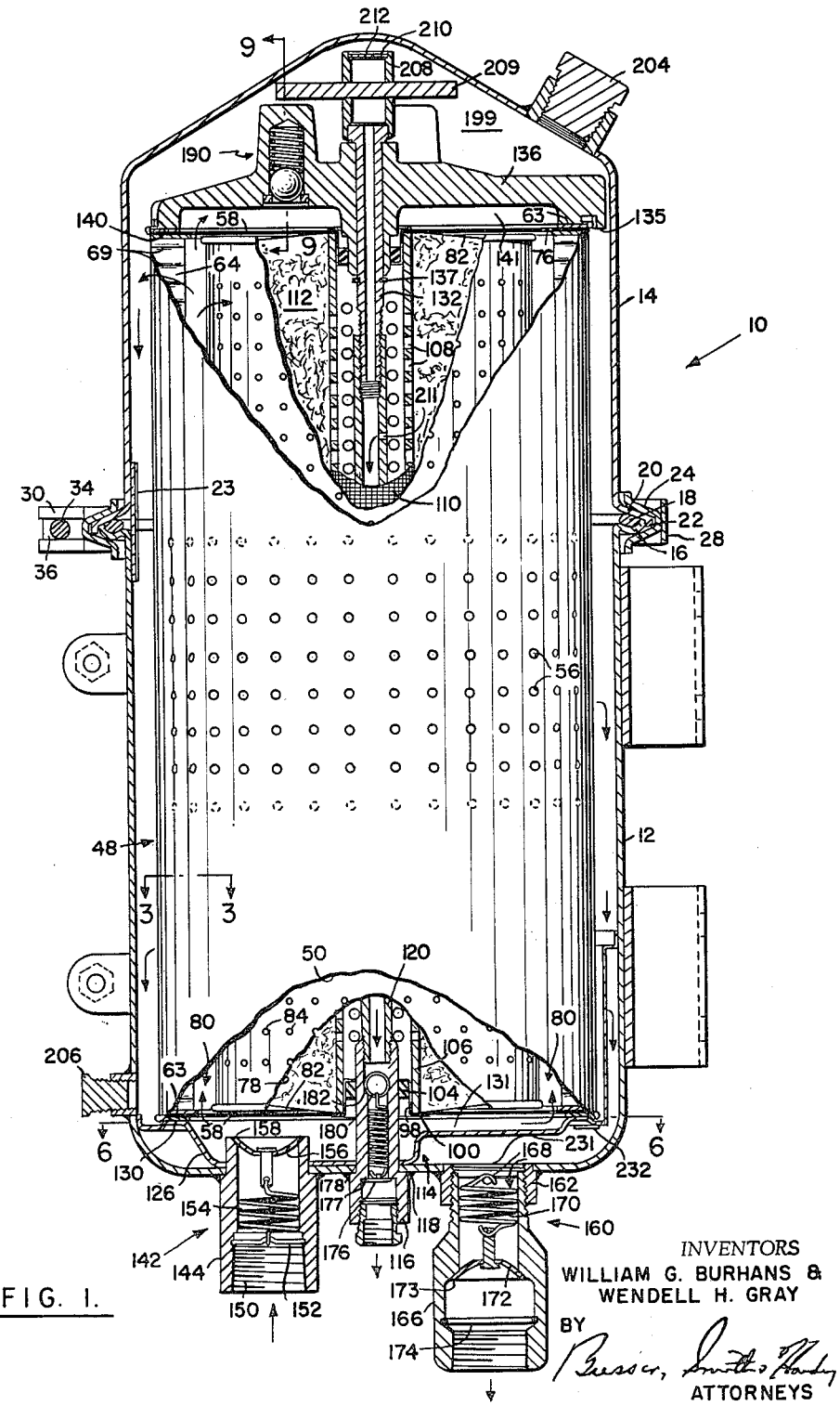
FIGURE 1 is a longitudinal section through a filter unit constructed in accordance with the invention, parts of the filter cartridge being broken away to clarify certain details of construction.
Figure 2:
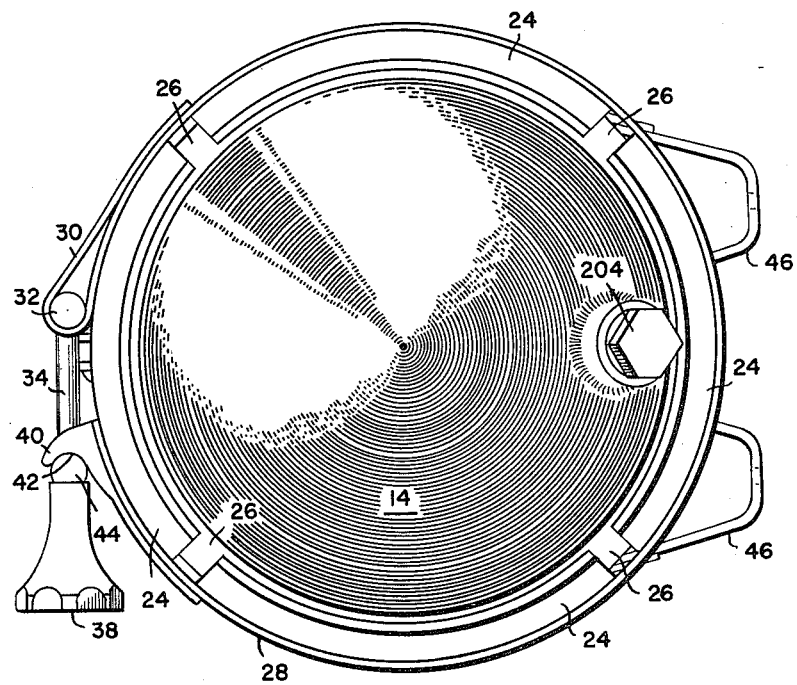
FIGURE 2 is a top view of the unit shown in FIGURE 1.

The filter unit constructed in accordance with the invention comprises a housing, generally designated 10, having a body section 12 and a cover section 14. Each of these sections is a deep drawn member made of sheet material such as steel or aluminum. At the upper terminal of the body section 12 is a radially outwardly extending flange 16 arcuately shaped in transverse section to form a seat for an O-ring 18. At the lower terminal of the cover section 14 is a radially outwardly extending axially sloping flange 20 terminating in a portion 22. The flange 20 overlies the O-ring 18 and the flange 16, the portion 22 of the flange 20 extending about the flange 16. Affixed to the cylindrical wall portion of the cover 14 are three circumferentially equally spaced guides 23 extending axially into the body section 12.

For detachably securing the cover and body sections together four arcuately shaped clamp shoes 24 are fitted over the flanges 16 and 20, the opposed ends thereof being spaced from one another, as at 26. These shoes are V-shaped in transverse section and are adapted for camming together the flanges 16 and 20. Embracing the several shoes 24 is a band 28, one end portion of which is folded back upon itself to form a loop 30. This loop embraces the head 32 of a T-shaped bolt, the stem 34 of which extends freely through an aperture 36 formed in the band 28 and has threaded on the free end thereof a nut 38. Affixed to the opposite end of the band 28 is a bifurcated fitting 40 which has a socket 42 formed therein. The nut 38 is provided with a rounded end portion 44 seated in the socket 42. Brackets for mounting the unit are indicated at 46.

Figure 4:
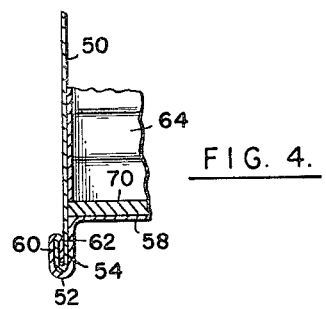
FIGURE 4 is an enlarged section on the plane indicated by line 4—4 of FIGURE 3.

Within housing 10 is a filter cartridge unit, generally designated 48. This unit comprises a cylindrical outer can body 50 made of light weight sheet metal. The body 50 is provided with a longitudinally extending lapped seam (not shown) spot-welded on approximately one-inch centers and soldered along the full length thereof. Each terminal portion of the body 50 is turned outwardly and rolled back, as at 52 (FIGURE 4), to form a circumferentially extending recess 54. The body 50 is provided all over with perforations 56, the aggregate area of the perforations being well in excess of that of the oil inlet. At each end of the body 50 is a cover 58 set back from the end of the body 50. The periphery of the cover 58 is rolled about the end of the body 50, as at 60, and tucked into the recess 54, as at 62, to form a tight seam. Adhesively secured to the cover 58 is a flat neoprene ring seal or gasket 63.

Figure 3:
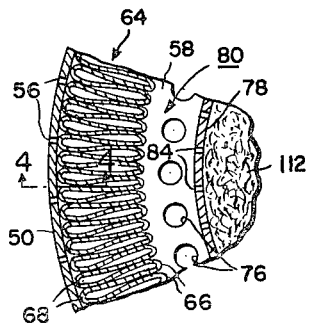
FIGURE 3 is an enlarged fragmentary section on the plane indicated by line 3—3 of FIGURE 1.

Within the body 50 is a cylindrical full-flow filter element 64 made of paper impregnated with a suitable substance. Referring particularly to FIGURE 3, the filter element 64 comprises tightly packed, narrow pleats with inner folds 66 and outer folds 68 at the juncture of adjacent pleats. The pleats extend along the axis of the filter and have transversely extending, axially spaced ribs 69 formed thereon to provide spacing between adjacent pleats as is best shown in FIGURE 1. The filter element 64 is provided with a large number of pleats so that there is a compact structure with adjacent pleats being in contact at the opposed rib portions thereof. The inner folds 66 are somewhat sharper than the outer folds 68 since there are an equal number of inner and outer folds but the inner folds are located along a smaller circumference. Each end of the filter element 64 is adhesively secured to a flat paper ring 70. Circumferentially spaced equally about each cover plate 58 are a series of openings 76 located just inside the filter element 64.

Figure 5:
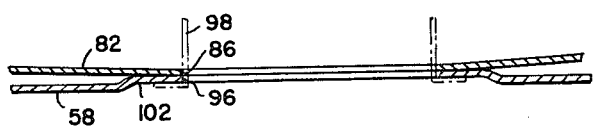
FIGURE 5 is a vertical section illustrating certain details of construction.

Within the body 50 is a cylindrical inner can body 78 made of light weight sheet metal and of a diameter appreciably smaller than the internal diameter of the filter element 64. The annular space between the body 78 and the filter element 64 communicates with the openings 76 in the cover 58 and forms a path or chamber, designated 80, for the entering oil. Each end of the body 78 is provided with a cover 82 secured to the body 78 in the same manner that the covers 58 are joined to the body 50. The body 78 is provided all over with perforations 84, and the covers 82 are provided with central openings 86 registering respectively with central openings 96 in the covers 58 (FIGURE 5). Driven into the openings 86 and 96 is the cylindrical body of a cup-shaped insert 98 provided with a radially outwardly extending flange 100 underlying a crimped central area 102 of the cover 58. Within the insert 98 is a neoprene seal or gasket 104. The inserts 98 have fitted thereover respectively the opposite end portions of a kraft paper tube 106, which tube is provided throughout the major portion of its length with numerous openings 108. The section of the tube provided with these openings is covered with a screen 110. The space surrounding the tube 104 and within the cylindrical body 78 is filled with an open fibrous material partial-flow filter element 112. The fibrous material may be, for example, a mixture of paper and wood. It should be noted that the opposite end portions of the filter cartridge are identical. The features of the assembly of the covers of the filter elements is disclosed and claimed in our copending application Serial No. 135,247, filed August 31, 1961.

Carried by the body 12 is means, generally designated 114, for mounting the filter cartridge unit 48 at its lower end. This means comprises a valve body 116 extending through the bottom wall of the body 12 and affixed thereto, as by welding 118. Threaded into the upper end portion of the body 116 is the lower end portion of a tubular center post 120. The upper end portion of the valve body 116 extends through a central opening in the base of the insert 98 and through a central opening in the gasket 104. Fitted over the valve body 116 is a dished plate 126 affixed to the body 116, as by welding. The plate 126 is provided with a raised, flat annular rim 130, upon which is seated the associated gasket 63. It will be observed that between the plate 126 and the overlying cover 58 and extending about the body 116 is a chamber 131 communicating with the openings 76 formed in the cover 58. At the upper end of the cartridge is a member 132, the lower end portion of which is threaded. The threaded portion of member 132 engages a threaded portion of the upper end portion of the center post 120. Member 132 is rotatably mounted in a top support member or head 136 and may move a slight axial distance limited by a snap ring 137 at the lower end and a shoulder at the upper end of the member 132. The head 136 has a generally circular shape and is provided with a flat annular rim 140 which cooperates with a gasket 63 for sealing the upper end of the cartridge. Head 136 has three circumferentially spaced flanges 135 which serve to locate the head 136 centrally with respect to the cartridge unit. Between the head 136 and the cover 58 and extending about the member 132 is a chamber 141 communicating with the openings 76 formed in the upper cover 58.

The body 12 is provided with an inlet valve assembly, generally designated 142. The inlet valve 142 is a check valve which permits flow through the valve in the direction into the filter and prevents any flow out of the filter. The valve has a body 144 which is secured by welding and extends through the bottom of the body 12 and through the plate 126. The lower end portion of the valve body is threaded, as at 150, for connection to a supply line. A pin 152 has opposite end portions secured in the valve body and has anchored thereto one end portion of a tension spring 154, the maximum diameter of this tension spring being only slightly less than the internal diameter of the body 144. The opposite end of the spring 154 is attached to a valve member 156 which is tapered, as shown, for engagement with a valve seat 158.

The body 12 is also provided with an outlet valve assembly, generally designated 160. The outlet valve is a check valve which permits flow through the valve in the direction out of the filter and prevents any flow into the filter. The valve has a member 162 extending through the bottom wall of the body 12 and affixed thereto, as by welding. Threaded onto the lower end portion of the member 162 is a coupling 166. A spring retainer 168 is affixed to the body 162 and has anchored thereto one end portion of the tension spring 170, the outside diameter of which is only slightly less than that of the internal diameter of the body 162. The opposite end portion of the spring 170 is affixed to a valve member 172 which is tapered, as shown, for engagement with a correspondingly tapered valve seat 173. A pin 174 has opposite end portions affixed to the coupling 166.

Within the valve body 116 is a by-pass valve 176, seated upon a shoulder 177 and carried by a tension spring 178 held by a ring 180 seated upon a shoulder 182.

The by-pass valve 176 is a check valve which permits flow through the valve in the direction out of the filter and prevents any flow through the valve in the reverse direction into the filter.

The top support head 136 mounts a plurality of relief valves, generally designated 190. These valves 190 are of the type described more fully and claimed in said copending application, Serial No. 135,247. For each valve, a dome 191 is formed in the head 136 and a chamber therein is defined by a bore 192 drilled from the underside. A compression coil spring 193 and a metal ball 194 each having a diameter slighlty less than bore 192 are received therein. Ball 194 is urged by the compressed spring 193 against a ring 195 providing a tapered valve seat 196. Ring 195 is retained in an enlarged bore 197 and constitutes the valve inlet port. Outlet ports are defined by passages 198 which communicate with bore 192 and are provided by drilling transversely through the sides of dome 191, it being noted that in its normal valve-closing condition the ball 194 rests on the seat 196 in a position opposite these passages 198. The passages 198 lead to a chamber 199 at the top of cover section 14 and thereby communicate with the anti-draining outlet valve assembly 160 as will be described hereafter.

The pressure differential relief valves 190 are employed to by-pass oil around the filter sections when the oil pressure within the chamber 141 is undesirably higher. Each valve 190 is spring loaded for opening in response to a given pressure differential, although the valves may be set to open at different differential pressures if desired. Typically each of the relief valves may be set to be opened by a pressure differential greater than approximately 45 p.s.i. The pressure differential depends, of course, upon the engine upon which the filter unit is mounted.

In the operation of each valve 190, as the pressure differential increases beyond a given level, ball 194 is lifted from seat 196. The flow of oil, however, is not controlled solely by the opening of a flow path between ball 194 and seat 196, but is controlled also by the relationship of ball 194 to side passage 198. As ball 194 rises, the obstruction to flow through passages 198 as through seat 196 is lessened, and vice versa as ball 194 moves downwardly.

The cover 14 is provided with an opening normally closed by a plug 204, and the body 12 is provided with an opening normally closed by a plug 206. Plug 204 is removed so that its fitting may be used for filling of the filter after the changing of a cartridge. This filling should be effected before the engine is started. Plug 206 is used for draining the filter.

An air bleed is provided to permit the escape of air from the by-pass flow passages during filling of the filter. To this end, tubular member 132 has another tubular member 208 secured to its upper end with the inner passages of the tubular members being in communication. Tubular member 208 extends axially to a location just short of the enclosed end of the cover section 14. A disc 210 encloses the upper end of member 208 and has an air bleed orifice 212 therein.

A rod 209 extends transversely through member 208 and serves as a handle which is used for assembling the head 136 on the upper end of the filter cartridge. The head 136 is forced tightly against the gasket by rotation of the handle (and conjoint rotation of the tubular members 132 and 208) as will be apparent by reason of the threaded connections shown in FIGURE 1. By an opposite rotation, the head 136 may be removed from the filter cartridge. It will be noted that by lifting the handle the ring 137 engages bottom of the head 136 so that the entire assembly may be raised from the cartridge. The handle construction eliminates the need for using a wrench or the like to assemble the head to the filter cartridge. The avoidance of the use of a wrench or the like prevents excessive tightening of the assembly.

Means are provided for preventing dirt particles, which fall into the filter during filter element changes or at other times when the cover section is removed, from getting into the oil system. To this end, the cartridge support plate 126 extends completely across the bottom of the filter body section 12 to contact the side walls thereof with a press fit. The plate 126 has an arcuate cutout 220 on the periphery thereof adapted to receive a standpipe 222 which will be described hereafter. The plate has circular openings 224, 226 and 228 for receiving, respectively, the inlet fitting 144, the by-pass outlet fitting 116, and a drain fitting 230 to be more fully described hereafter. Accordingly, the support plate 126 seals off the bottom of the filter completely so that any dirt particles which fall into the filter will come to rest on the support plate.

The support plate is provided with an arcuate raised portion 231 overlying the outlet fitting 162. This provides an enlarged chamber in alignment with the outlet fitting whereby the flow of oil will not be restricted in this location.

The standpipe 222 nests within the cutout 220 to seal the plate 126 at this location and extends axially along the inner wall of body section 12 to provide outlet openings at a location above the plate 126. By reason of the provision of the standpipe means, the oil in the filter must rise to a predetermined level above the support plate 126 before it can pass to the outlet fitting 162. Since any dirt particles which may have fallen into the filter would rest on the support plate, these dirt particles will not rise to the outlet opening provided by the standpipe and cannot get into the oil system.

Figure 6:
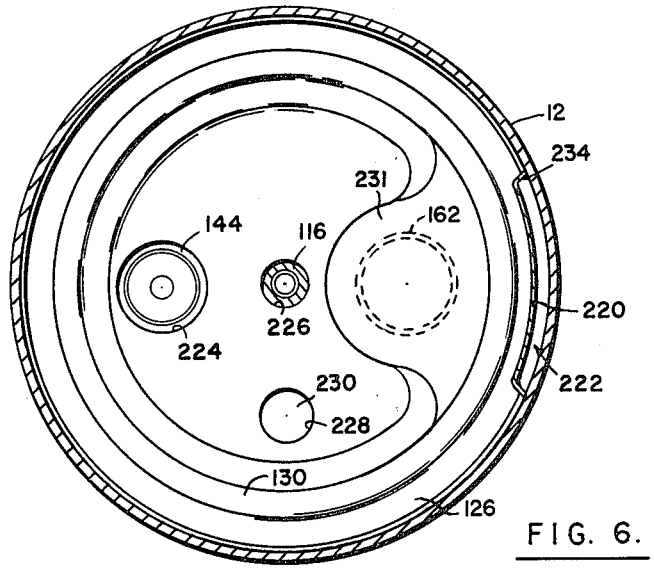
FIGURE 6 is a section taken generally on the plane indicated at 6—6 of FIGURE 1.
Figures 7, 8:
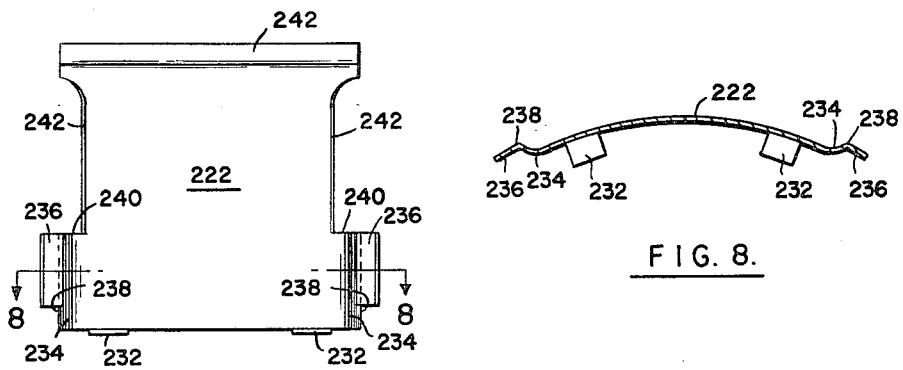
FIGURE 7 is a view of a detail of the filter.
FIGURE 8 is a top view of the detail shown in FIGURE 7.
Figure 9:
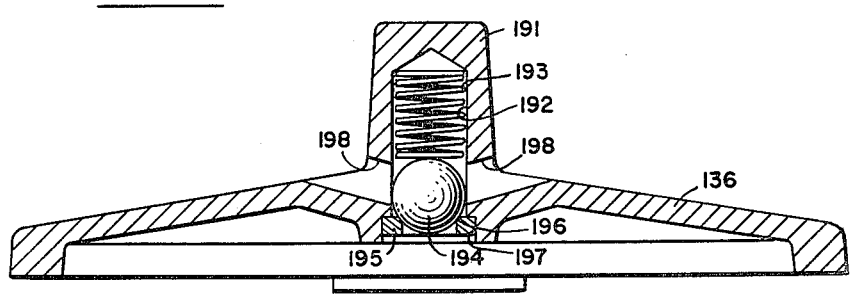
FIGURE 9 is a section taken on the plane indicated at 9—9 of FIGURE 1.

The standpipe 222 has a generally arcuate shape as is best shown in FIGURE 8, this shape at the lower end being such that the standpipe fits closely within the arcuate cutout 220 in the support plate (see FIGURE 6).

A pair of tabs 232 extend inwardly from the bottom end of the standpipe and contact the underside of the support plate 126 for axially positioning the standpipe relative to the support plate. The tabs 232 are spot welded to the plate 126. A pair of wing-like portions 234 extend laterally from the bottom end of the standpipe and have an arcuate shape corresponding to the shape of the ends of the cutout 220 in the support plate. Each of the portions 234 has a tab 236 extending therefrom and having a shape conforming to the inner wall of the filter body section 12. These tabs 236 contact the inner wall of the filter body section and serve to position the standpipe. The axially extending edges 238 of the flaps 234 also engage the inner wall of the body section and in cooperation with the tabs 236 provide a sealing contact between the standpipe and the body section. The portions 234 terminate at transversely extending edges 240. At its upper end the standpipe is provided with an arcuate flange 242 shaped to engage the inner wall of the body section 12.

At each side of the standpipe 222 there is provided a cutout 242 terminating at its lower end at the edge 240. It will be apparent that the side edges of the standpipe at cutouts 242 above the edge 240 are spaced from the inner wall of the body section 12 to provide ports for the flow of oil from the annular space 208 between the filter cartridge 48 and the body section 12. It is noted that in view of the sealing contact between the portions 234 with the body section 12, the oil must rise to a level above the edges 240 before there can be any flow to the outlet valve 160. In this manner the standpipe prevents removal of any dirt resting on the cartridge support 126 so that this dirt cannot get into the oil system.

In addition to the above described function of the standpipe, this element has the additional function of serving as an air bleed when the filter is mounted in a horizontal position. Although the above description is directed to a filter which is mounted in a vertically extending position as shown in the drawings, in some instances it may be desirable to mount the filter in a horizontally extending position. In its horizontal position, the filter is arranged with the standpipe 222 at the upper end of the filter. This position would be that viewed from the left of FIGURE 1. Since the standpipe is at the highest point in the filter in the horizontal mounting thereof, as the oil level rises air may bleed from the internal filter passages out of the openings provided by the standpipe 222 and out of the filter through the plug 204.

Because of the standpipe arrangement, it is not possible to drain the filter completely by means of drain plug 206 and outlet valve 160. It is noted that the drain plug 230 communicates with the bottom of inlet chamber 131 of the filter by way of opening 228. By reason of the location of drain 230 it is possible to drain the filter completely. Moreover, it is possible to drain oil from the inlet side of the filter when desired.

In the operation of the filter, oil is delivered from the crank case of the engine under pressure by way of the usual lubricating oil pump. The flow is indicated by the arrows in FIGURE 1. The oil flows through the check valve 156 into a bottom chamber 131 and passes through a plurality of circumferentially spaced ports 76 into the annular chamber 80 between the tubular filter elements 64 and 112.

Outer filter element 64 serves as the full-flow filter and is made of paper folded as shown in FIGURE 3 within a perforated outer cylinder 50, this filter being designed to filter out the solid impurities which injure the bearings. Inner filter element 112 serves as the partial-flow filter and is made of a fibrous material such as a mixture of paper and wood designed to filter out the impalpable impurities. It is noted that the partial-flow filter is made of a separate can which is inserted within the full-flow filter during assembly of the filter cartridge.

As shown by the arrows in FIGURE 1, from chamber 80 the flow divides with some oil flowing outwardly through the full-flow filter element 64 into the outlet chamber 208 and the rest of the oil flowing inwardly through the partial-flow filter element 112 into the central chamber surrounding the tubular center post 120. The oil which has been filtered by the full-flow filter passes from the chamber 208 through the openings in the standpipe 222 and check valve 160 to the engine bearings from which the oil returns to the crank case. The oil which has been filtered by the partial-flow filter passes from the central chamber through the orifice 211 at the upper end of the center post and through the interior of the center post and check valve 114 to the crank case. The filter is designed so that the ratio of full to partial flow is about 20:1. Since the major portion of the flow is through the full-flow filter, the partial-flow filter does not become clogged even though this filter will prevent the flow of smaller size particles.

The oil which enters the annular chamber 80 is under a substantial pressure which is provided by the pump. Accordingly, this oil flows upwardly through the annular chamber at a substantial velocity and with a turbulent flow to thereby wash the surfaces of the filters by dislodging large particles from the inner filter 112, which particles will be caught by the outer filter 64. Oil also flows from chamber 80 through a plurality of circumferentially spaced openings at the upper end of this chamber into an upper chamber 141. Accordingly, the high inlet pressure is provided in both chambers 131 and 141. This high inlet pressure serves to provide an effective seal between the filter elements and the center post. This high inlet pressure acting upon the gaskets 104 presses each of them against the base of the associated insert 98, as a consequence of which the gaskets 104 are compressed and tend to increase in outside diameter and decrease in inside diameter. Thus the gaskets 104 seal tightly against the cylindrical bodies of the inserts 98, the valve body 116 and the member 132, and the greater the oil pressure in the chambers 131 and 141, the more the gaskets 104 are compressed and the tighter they seal.

Pressure differential valves 190 are employed to by-pass oil around the filters when the oil pressure within the chamber 141 is undesirably high. If the full-flow filter should become clogged the relief valves 190 would by-pass flow to the outlet chamber 208 so that the engine bearings would still receive oil.

The construction providing for the flow of oil into an annular chamber from which the flow divides with a portion flowing radially outwardly through the full-flow filter elements and the remaining portion flowing radially inwardly through the partial-flow filter element has several advantages over prior filters. By reason of this flow path, if the full-flow filter element, which receives most of the flow, should become blocked, the partial-flow filter element is still operable to perform filtering while oil is by-passed to the full-flow outlet to maintain a supply to the engine bearings. Moreover, the partial-flow filter element has a longer life because it does not become clogged with large particles which are removed primarily by the full-flow filter element because the major flow is through this full-flow element. The life of the partial-flow filter element is also increased by reason of the high velocity flow upwardly through the annular chamber, this flow, by reason of its turbulence, performing a washing function and tending to prevent rapid clogging of the filter elements.

Another advantage of the flow path in accordance with the filter in accordance with the invention is that as the filter cake builds up on the filter elements and the pressure in the annular inlet chamber is increased, this increased pressure is applied to the inlet of both the full-flow and the partial-flow filter elements. This tends to maintain the desired flow through both the filter elements in spite of the increased resistance to flow.

The filter cartridge in accordance with this invention has a very simple construction and comprises a separate tubular inner filter element contained within a separate outer tubular filter element with the ends being sealed by a simple cup-shaped sealing means as is discussed hereinbefore. This simple construction permits the use of various size filter elements without the need for a substantial alteration of the filter construction. Moreover, the cartridge is adapted for the stacking of a plurality of cartridges, the aligned annular chambers cooperating to permit flow therebetween so that the above-discussed divided flow is achieved with a stacked cartridge.

The assembled filter provides a pair of chambers 131 and 141 at opposite ends of the cartridge. The chambers are in flow communication by way of the annular chamber 80 so that a high pressure corresponding approximately to the inlet pressure is provided in these chambers. Accordingly, this relatively high inlet pressure is applied to both the sealing means at each end of the cartridge to provide an effective seal.

Another feature of the invention is the location and construction of the by-pass or relief valves 190. These valves serve to by-pass flow to the filter outlet leading to the engine bearings. The by-pass valves are located at the opposite end of the filter from the inlet thereof and in communication with the annular inlet passageway. Accordingly, these valves are responsive directly to the pressure at the inlet to both the full-flow and the partial-flow filter elements.

When the full-flow filter element is plugged, it becomes necessary, of course, to remove the cartridge and to replace it with a fresh cartridge. In order to make the change, the nut 38 is turned out to loosen the band 28, whereupon the band 28 and shoes 24 are removed and the cover 12 is lifted from the body 14. Now the member 132 is unscrewed from the center post 120 by means of handle 209 and is removed with the head 136 and the several relief valves 190 as a unit. The exhausted cartridge may now be removed and replaced with a fresh one. In this connection, it will be noted that both the full-flow and partial-flow filter sections are incorporated in a single replaceable unit for easy handling. After the fresh unit is in place, the assembly comprising member 132 and the head 136 and relief valves 190 is replaced.

After replacing the cover, the plug 204 is removed, thus venting the unit. Oil is now poured into the unit through the vent opening to fill the unit. In this way oil is supplied to the bearings as soon as the engine starts.

During filling of the filter, the orifice 212 and the passages communicating therewith provide a bleed for the by-pass flow passages inside of the inner filter element 112. A similar procedure is used when the filter is mounted horizontally, in which case the air bleeds out of the internal passages by way of the standpipe openings.

When the engine stops, oil ceases to flow through the filter unit, but oil in the filter unit is trapped by the inlet valve and cannot drain therefrom back through the oil pump.

It will be understood, of course, that the present invention, as shown and described, is susceptible of various changes and modifications which may be made without departing from the principles of the invention. Accordingly, it is intended to claim the present invention broadly as well as specifically as indicated in the appended claims.

What is claimed is:

1. In a filter for liquids, the combination comprising a housing, a filter cartridge including a pair of tubular filter elements, one of said filter elements being positioned within the other, said filter elements defining an annular space therebetween, means mounting said filter cartridge within said housing and sealing the opposite ends thereof to define a pair of chambers each of which encloses one end of said cartridge, said annular space extending between said chambers to place the same in communication with each other, inlet means for directing liquid flow from the exterior of said housing into one of said chambers, said inlet means including a check valve for controlling the flow through said inlet means such that liquid may flow into the filter but may not flow out of the filter, said filter elements being constructed to direct liquid to flow from said annular space outwardly through the outside filter element and inwardly through the inside filter element, first outlet means for directing liquid flow from a chamber externally of said outside filter element to the exterior of said housing, said first outlet means including a check valve for controlling flow therethrough such that liquid may flow out of the filter but may not flow into the filter, and second outlet means for directing liquid flow from a chamber within said inner filter element to the exterior of said housing, said second outlet means including a check valve for controlling flow therethrough such that liquid may flow out of the filter but may not flow into the filter.

2. In a filter for liquids, the combination comprising a housing, a filter cartridge including tubular full-flow and partial-flow filter elements one within the other, said filter elements defining an annular space therebetween, means mounting said filter cartridge within said housing including a tubular post affixed to said housing and extending into the inner one of said filter elements, and means carried by said post and engaging said cartridge thereby to support the same and seal the opposite ends thereof, said cartridge supporting and sealing means forming a pair of chambers respectively overlying opposite ends of said cartridge, inlet means from the exterior of said housing directly to one of said chambers, said inlet means including a one-way valve means for limiting the liquid flow through said inlet means to the direction into said one chamber, said annular space extending between said chambers to place said chambers in direct communication with each other whereby to equalize the unit fluid pressures within said chambers and upon the opposite ends of said cartridge, said filter elements being constructed to direct liquid to flow from said annular space outwardly through one of said filter elements and inwardly through the other of said filter elements, first outlet means from a space within said housing and surrounding said cartridge and chambers directly to the exterior of said housing, said first outlet means including a one-way valve means for limiting the liquid flow through said first outlet means to the direction out of said last-mentioned space, and second outlet means from a space within the inner one of said filter elements and surrounding said post directly to the exterior of said housing via the interior of said post, said second outlet means including a one-way valve means for limiting the liquid flow through said second outlet means to the direction out of the interior of said post.

3. In a filter for liquids, the combination comprising a housing, a filter cartridge including tubular full-flow and partial-flow filter elements one within the other, said filter elements defining an annular space therebetween, means mounting said filter cartridge within said housing including a tubular post affixed to said housing and extending into the inner one of said filter elements, and means carried by said post and engaging said cartridge thereby to support the same and seal the opposite ends thereof, said cartridge supporting and sealing means forming a pair of chambers respectively overlying opposite ends of said cartridge, a pair of elements respectively at opposite ends of said cartridge sealing off from said chambers a space within the inner one of said filter elements and surrounding said post, means providing seats for said sealing elements, said sealing elements being exposed to fluid pressures in said chambers for expanding radially when pressed against said seats by said fluid pressures thereby to seal tightly against said post, inlet means from the exterior of said housing directly to one of said chambers, said inlet means including a one-way valve means for limiting the liquid flow through said inlet means to the direction into said one chamber, said annular space extending between said chambers to place said chambers in direct communication with each other whereby to equalize the unit fluid pressures within said chambers and upon the opposite ends of said cartridge, said filter elements being constructed to direct liquid to flow from said annular space outwardly through one of said filter elements and inwardly through the other of said filter elements, first outlet means from a space within said housing and surrounding said cartridge and chambers directly to the exterior of said housing, said first outlet means including a one-way valve means for limiting the liquid flow through said first outlet means to the direction out of said last-mentioned space, and second outlet means from said space within the inner one of said filter elements and surrounding said post directly to the exterior of said housing via the interior of said post, said second outlet means including a one-way valve means for limiting the liquid flow through said second outlet means to the direction out of the interior of said post.

4. In a filter for liquids, the combination comprising a housing, a filter cartridge including a tubular full-flow filter element, and a tubular partial-flow filter element within said full-flow filter element, said filter elements defining an annular space therebetween, means mounting said filter cartridge within said housing including a tubular post affixed to said housing and extending into said partial-flow filter element, and a pair of plates carried by said post and operatively engaging said cartridge thereby to support the same and seal the opposite ends thereof, said plates forming a pair of chambers respectively overlying opposite ends of said cartridge, a pair of elements respectively at opposite ends of said cartridge sealing off from said chambers a space within said partial-flow filter element and surrounding said post, a pair of means set back respectively from the opposite ends of said cartridge and extending radially inwardly from the inner wall of said partial-flow filter element thereby to provide seats for said sealing elements, said sealing elements being exposed to fluid pressures in said chambers for expanding radially when pressed against said seats by said fluid pressures thereby to seal tightly against said post, inlet means from the exterior of said housing directly to one of said chambers, said inlet means including a one-way valve means for limiting the liquid flow through said inlet means to the direction into said one chamber, said annular space extending between said chambers to place said chambers in direct communication with each other whereby to equalize the unit fluid pressures within said chambers and upon the opposite ends of said cartridge, said filter elements being constructed to direct liquid to flow from said annular space outwardly through one of said filter elements and inwardly through the other of said filter elements, first outlet means from a space within said housing and surrounding said cartridge and chambers directly to the exterior of said housing, said first outlet means including a one-way valve means for limiting the liquid flow through said first outlet means to the direction out of said last-mentioned space, and second outlet means from said space within said partial-flow filter element and surrounding said post directly to the exterior of said housing via the interior of said post, said second outlet means including a one-way valve means for limiting the liquid flow through said second outlet means to the direction out of the interior of said post.

5. In a filter for liquids, the combination comprising a housing, a filter cartridge including a tubular full-flow filter element, and a tubular partial-flow filter element within said full-flow filter element, said filter elements defining an annular space therebetween, means mounting said filter cartridge within said housing including a tubular post affixed to said housing and extending into said partial-flow filter element, and a pair of plates carried by said post and operatively engaging said cartridge thereby to support the same and seal the opposite ends thereof, said plates forming a pair of chambers respectively overlying opposite ends of said cartridge, inlet means from the exterior of said housing directly to one of said chambers, said inlet means including a one-way valve means for limiting the liquid flow through said inlet means to the direction into said one chamber, said annular space extending between said chambers to place said chambers in direct communication with each other whereby to equalize the unit fluid pressures within said chambers and upon the opposite ends of said cartridge, said filter elements being constructed to direct liquid to flow from said annular space outwardly through one of said filter elements and inwardly through the other of said filter elements, first outlet means from a space within said housing and surrounding said cartridge and chambers directly to the exterior of said housing, said first outlet means including a one-way valve means for limiting the liquid flow through said first outlet means to the direction out of said last-mentioned space, and second outlet means from a space within said partial-flow filter element and surrounding said post directly to the exterior of said housing via the interior of said post, said second outlet means including a one-way valve means for limiting the liquid flow through said second outlet means to the direction out of the interior of said post.

6. The combination according to claim 5 including air bleed means including a conduit means communicating with the interior of said tubular post and extending axially therefrom to a location externally of one of said plates adjacent one end of said filter.

7. The combination according to claim 6 wherein said tubular post is threadedly engaged in its supporting position, said conduit means being fixedly secured to said post, and comprising a handle secured to said conduit means for effecting rotation thereof and of said post for disengaging the latter.

8. In a filter for liquids, the combination comprising a housing, a filter cartridge including a pair of tubular filter elements, one of said filter elements being positioned within the other, said filter elements defining an annular space therebetween, means mounting said filter cartridge within said housing and sealing the opposite ends thereof to define a pair of chambers each of which encloses one end of said cartridge, said annular space extending between said chambers to place the same in communication with each other, said filter cartridge mounting and sealing means including a means extending across said housing at one end of said filter cartridge and contacting the inner wall of said housing for trapping relatively large dirt particles which may get into the housing, said last-mentioned means comprising a plate extending transversely across said housing and a standpipe extending axially of said filter in the chamber externally of said filter element, inlet means for directing liquid flow from the exterior of said housing into one of said chambers, said inlet means including a check valve for controlling the flow through said inlet means such that liquid may flow into the filter but may not flow out of the filter, said filter elements being constructed to direct liquid to flow from said annular space outwardly through the outside filter element and inwardly through the inside filter element, first outlet means for directing liquid flow from a chamber externally of said outside filter element to the exterior of said housing, said first outlet means including a check valve for controlling flow therethrough such that liquid may flow out of the filter but may not flow into the filter, and second outlet means for directing liquid flow from a chamber within said inner filter element to the exterior of said housing, said second outlet means including a check valve for controlling flow therethrough such that liquid may flow out of the filter but may not flow into the filter.

9. The combination according to claim 8 wherein said standpipe defines at least one opening for the flow of liquid from said chamber externally of said outer filter element to said check valve of said first outlet means, said opening being spaced axially from said plate.

10. The combination according to claim 8 wherein said plate is dished whereby oil collects therein, and including means for draining oil from said dished plate to the exterior of said filter.

11. In a filter for liquids, the combination comprising a housing, a filter cartridge including a pair of tubular filter elements, one of said filter elements being positioned within the other, said filter elements defining an annular space therebetween, means mounting said filter cartridge within said housing and sealing the opposite ends thereof to define a pair of chambers each of which encloses one end of said cartridge, said annular space extending between said chambers to place the same in communication with each other, inlet means for directing liquid flow from the exterior of said housing into one of said chambers, said inlet means including a check valve for controlling the flow through said inlet means such that liquid may flow into the filter but may not flow out of the filter, said filter elements being constructed to direct liquid to flow from said annular space outwardly through the outside filter element and inwardly through the inside filter element, said outer filter element having a porosity substantially greater than said inner filter element whereby the major portion of the flow is through the former, first outlet means for directing liquid flow from a chamber externally of said outside filter element to the exterior of said housing, said first outlet means including a check valve for controlling flow therethrough such that liquid may flow out of the filter but may not flow into the filter, and second outlet means for directing liquid flow from a chamber within said inner filter element to the exterior of said housing, said second outlet means including a check valve for controlling flow therethrough such that liquid may flow out of the filter but may not flow into the filter.

References Cited by the Examiner
UNITED STATES PATENTS

| | | | |
|---|---|---|---|
| 2,598,322 | 5/58 | Vokes | 210—315 X |
| 2,747,744 | 5/56 | Gretzinger | 210—442 |
| 2,995,253 | 8/61 | Belgarde et al. | 210—130 X |

REUBEN FRIEDMAN, *Primary Examiner.*